Dec. 19, 1939.   G. R. CUNNINGTON   2,184,139
LAMINATED THERMOPLASTIC INSULATION MATERIAL
Filed Jan. 7, 1937

INVENTOR.
GEORGE R. CUNNINGTON
BY Parker & Burton
ATTORNEYS.

Patented Dec. 19, 1939

2,184,139

UNITED STATES PATENT OFFICE 2,184,139

LAMINATED THERMOPLASTIC INSULATION MATERIAL

George R. Cunnington, Detroit, Mich., assignor to Woodall Industries Incorporated, Detroit, Mich., a corporation of Michigan Application January 7, 1937, Serial No. 119,383

3 Claims. (Cl. 154—44)

My invention relates to an improved laminated sheet of thermoplastic insulation material and to an improved process of fabricating the same. It is a development of the invention described in my application Serial No. 76,105, filed April 24, 1936.

This improved laminated sheet possesses the capacity under predetermined conditions, as under the influence of a predetermined temperature, of adhering itself to a supporting surface.

An object is to provide a laminated sheet wherein an interior lamination possesses, under predetermined conditions, the capacity of adhering itself to a supporting surface and wherein one outer surface lamination of the sheet is adapted to permit such adhesive securement of the interior lamination therethrough and the other outer surface lamination is adapted to prevent said adhesive securement therethrough and wherein under normal conditions each outer surface lamination of the sheet is adapted to prevent adhesion of the interior lamination therethrough.

While possessing the capacity under the influence of heat of self-adhesion through one of its surfaces as above stated the sheet is so constructed that a plurality of such sheets may be stacked for storage or shipment without danger of successive sheets in the stack adhering to each other as a result of such stacking.

More specifically an object of the invention is the provision of a laminated thermoplastic insulation sheet characterized by the capacity of self-adhesion as above described and wherein the surface of the sheet through which adhesion to a support is to be effected, is provided with an outer layer of thin loose non-sticky material which will prevent, under normal conditions, the sheet from adhering to another sheet upon which it is disposed, thereby permitting stacking of the sheets in piles without the danger of accidental adhesion. This outer lamination is preferably of thin loose non-adhesive material which is sufficiently porous and sufficiently absorptive of the fused adhesive ingredient of the sheet as to permit such adhesive ingredient when fused to flow therethrough to effect adhesion of the laminated sheet to a support.

Another object is the provision of a laminated sheet of the character generally described above made up of three laminations as follows. The interior lamination, which constitutes the main body of the sheet in thickness, is a lamination of composition thermoplastic material which possesses the capacity, under predetermined conditions, of wilting to conform to an irregularly contoured supporting surface and of fusing to adhere thereto. One outer surface lamination is formed of relatively thin flexible non-adhesive material sufficiently porous to permit, under said predetermined conditions, adhesion therethrough from the interior lamination but capable of preventing fusing adhesion therethrough at atmospheric temperatures. The other outer surface lamination is formed of a tough flexible non-adhesive material resistant to the flow of asphalt therethrough from the interior lamination whether such adhesive is fused or not.

The above and other objects, advantages and meritorious features of my invention will more fully appear from the following description, appended claims and accompanying drawing, wherein:

Figure 1:
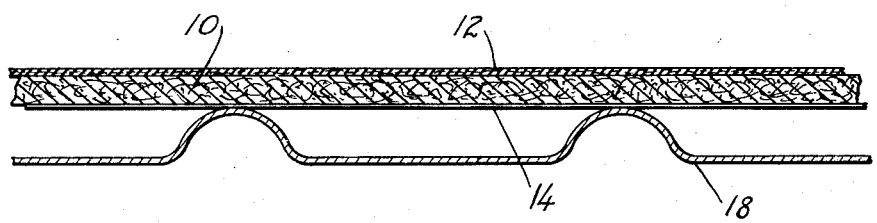
Figure 1 is a sectional view through elements embodying my invention showing the laminated thermoplastic insulation sheet separate from the supporting metal sheet.

My improved laminated sheet of insulation material is adapted for many uses but one use for which it is particularly fitted is as a floor covering for certain compartments of automobile bodies such as the floor of the rear deck or trunk compartment or even as an insulation covering for the floor generally. It might also be applied to other wall sections of the body and wherever its use was deemed desirable.

Such sheet contains an adhesive or binder ingredient which possesses the capacity, under predetermined conditions as, for example, under the influence of a predetermined degree of heat, of fusing for self-adhesion to a wall surface which is to support the sheet. It possesses the capacity when adhered thereto of deadening or minimizing the vibration of such wall section. The wall sections of an automobile body which it is desired to silence are formed of metal and upon travel of the automobile over the road tend to produce and transmit sound vibrations. Upon the application of my improved laminated sheet thereto the sound vibrations created or transmitted by such metal wall sections are minimized and damped out.

In the drawing my improved sheet is made up of three laminations of material. The interior lamination which constitutes the main body of the sheet is made up of a composition fibrous material wherein the fibers are held together by a suitable binder responsive to the influence of a predetermined degree of temperature of fusing and adhering to the surface which supports the sheet. Preferably this particular lamination is also adapted under the influence of the heat which produces adhesion of the sheet to the supporting surface of expanding or blowing to increase its thickness and insulating characteristics. Such lamination also possesses the capacity under the influence of the heat of wilting to conform with an irregularly contoured surface upon which it may be supported so that even though such supporting surface may be irregular the laminated insulation sheet will have adhesive contact therewith throughout a large area to properly serve its insulating function.

This particular application, however, is not directed to broadly claiming a sheet possessing the capacity of self-adhesion, blowing, or wilting, but is directed to a laminated sheet wherein an interior lamination possessing one or more of these characteristics is provided on an outer surface with a non-adhesive lamination of the character herein set forth. The invention herein claimed is directed as limited in the claims to a laminated sheet wherein outer laminations as herein characterized are associated with an interior lamination adapted under predetermined conditions to adhere itself to a supporting sheet through one outer lamination.

The interior lamination is herein indicated as 10. It is a thermoplastic composition lamination. It consists of loose fibers held together by a suitable binder such as asphalt. The asphalt is present in such a quantity in proportion to the fiber filler that, following fabrication of the sheet, there is an excess of asphalt present to spew out and flow down for adhesion. By excess of asphalt is meant an amount in excess of that required to saturate the fibers and bond them together. The fibrous filler may make up 20% as against 80% of asphalt by weight. Preferably the fibers are mixed as loose fibers in the asphalt rather than through the impregnation of a felted or formed fibrous sheet with asphalt. Mixed as loose fibers in the mastic they do not tend, under the predetermined conditions requisite for adhesion, to impede the free flow and movement of the asphalt downwardly but constitute sufficient of a barrier to prevent the asphalt from flowing and spreading over a supporting sheet beyond the area covered by the mastic layer and direct the movement of the asphalt downwardly.

Reclaimed automobile tire fibers or cords, which in the reclaiming have been separated from the rubber though retaining a residuum of the rubber content, have been found suitable for this fibrous filler. These fibers are coarse and of relatively short length. They are resistant to absorption of the asphalt during the mixing operation, though the mixing operation is carried on with the asphalt in a highly fluid state and at a relatively high temperature.

Preferably also the fibers have had water added to them before being mixed with the hot fluid asphalt. Notwithstanding the fact that the fluid asphalt is mixed with the fibers at a temperature substantially above the boiling point of water and therefore much of the water escapes as steam during the manufacture it has been found that the sheet when completely fabricated as herein described possesses a water content normally in excess of 1% by weight of the entire sheet. It is desirable that the water content of the sheet equal or exceed this amount. It is thought that the presence of the water in the sheet probably subserves two desirable functions. Its vaporization under the heat of adhesion probably facilitates the spewing of the asphalt under the influence of heat to cause adhesion of the mastic to a support and also perhaps limits the absorption of asphalt by the fibers thereby insuring an excess of asphalt to fuse and spew or flow down for adhesion. Vaporization of the water probably also facilitates expansion of the sheet under the heat of adhesion.

The instant invention, however, concerns itself with the provision of one or more outer surface laminations as herein described in combination with a mastic sheet of the character set forth. Upon one surface of the mastic sheet 10 there is secured a lamination of tough flexible moderately stretchable material such as a rubber cellulose combination sheet 12. A suitable material is a latex saturated cellulose sheet which is on the market under the commercial name of Lexide. An asphalt saturated felt sheet, tough, strong, flexible and non-sticky may be employed. This sheet may be rolled onto the mastic sheet after the asphaltic mastic has come out of the extruding machine through which it has been passed from the mixer in the process of its manufacture. The mastic layer and the Lexide lamination may be passed between calendar rolls to compress the mastic layer and securely attach the lamination 12 thereto. This will be done while the mastic is sufficiently hot to enable the lamination 12 to be adhered thereto by the asphaltic adhesive of the mastic.

There is secured to the opposite surface of the mastic layer the lamination 14 which is a sheet of thin cellulose crepe wadding. Such a sheet is more loose and porous than ordinary paper tissue which normally has a substantial body. This flexible porous absorbent crepe wadding is adhesively secured to the surface of the mastic layer opposite the lamination 12 by the asphalt of the mastic layer. The lamination 14 is brought into juxtaposition with the surface of the mastic and compressed thereagainst under the influence of suitable rolls or the like. This is accomplished when the mastic is at a temperature which will not cause the asphalt to pass through the wadding but will securely adhere the wadding lamination thereto. The lamination 14 is preferably adhered to the mastic layer following the adhesive securement of the lamination 12 thereto. The lamination 12 is firmly compacted and secured to the mastic layer while the asphaltic binder is sufficiently sticky to securely adhere the lamination 12 thereto. The lamination 14 is applied to the mastic layer after the asphaltic binder has cooled sufficiently so as not to saturate such layer.

Sheets constructed in this fashion may be stacked one upon another in piles for storage or shipment without danger of adhesion of the sheets together under normal atmospheric temperature and without the employment of separation layers or sheets of foreign material to prevent such adhesion.

In the attachment of a laminated sheet of this character to a metal wall as, for example, the metal floor 18 of an automobile body, such sheet is cut to size and placed upon the floor area to be covered with the lamination 14 juxtaposing the metal sheet as shown in Fig. 1. The body is then subjected to a temperature sufficient to cause the asphaltic binder in the mastic to fuse and to flow, drain down or spew upon the floor 18 and adhere thereto. This may be accomplished by passing the automobile body for a protracted period through an oven heated sufficiently to heat the mastic layer throughout to such a point as to cause the asphalt to flow or spew downwardly from the mastic layer and adhere the sheet to the metal floor.

The heated ovens through which the bodies are passed may be the ovens in standard use in finishing automobile bodies. The heat of these ovens may vary from 180° to 240° F. To avoid additional cost this improved laminated sheet may be placed in the body before the body goes through these heat treatment ovens in the normal finishing operation of the automobile. At some of the low temperatures below the boiling point of water it has been found difficult to obtain proper adhesion of the laminated sheet to the metal wall of the body. It is therefore imperative that the surface to be adhered be of such a character that its adhesion be facilitated. The absorbent character of the wadding and its perviousness to fused asphalt facilitates such adhesion probably through a wicking action.

The loose character of the wadding permits the sheet of wadding to be stretched during its application to the mastic so that it is stretched taut thereover providing a lamination of a minimum thickness capable of serving the required purpose. This stretching also permits the employment of a minimum amount of wadding for the surface area of the mastic to be covered.

As lamination 12 and 14 is each freely flexible the mastic is free to wilt without resistance to conform with irregularity of contour of supporting wall section of the body being covered thereby. This is important in order that adhesion over a maximum surface area may be obtained.

Figure 2:
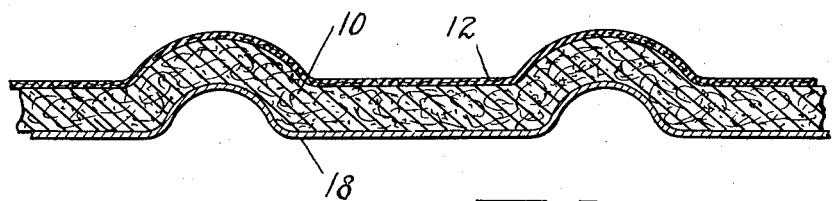
Fig. 2 is a similar sectional view showing the same elements following the fusing of the laminated thermoplastic sheet to the metal supporting sheet.
Figure 4:
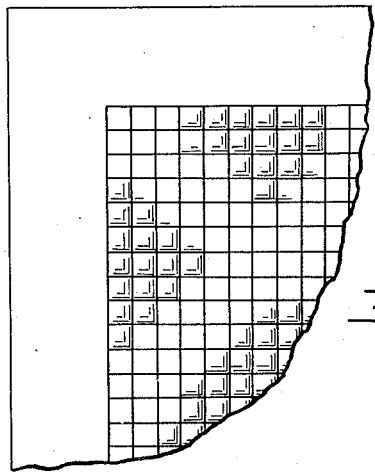
Fig. 4 is a plan of a fragment of the embossed surface of the modified form of the improved sheet.
Figure 3:
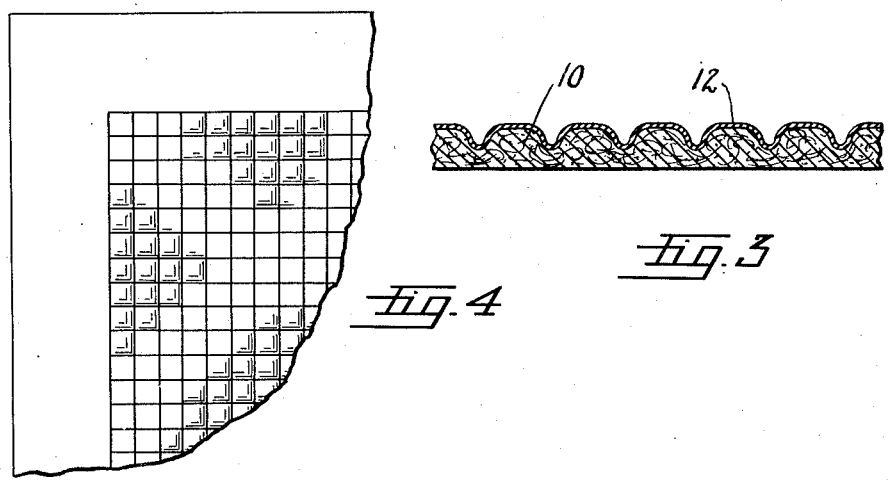
Fig. 3 is a section through a modified form of my improved laminated thermoplastic insulation sheet.

The lamination 12 is exceedingly tough and strong as well as flexible and also somewhat stretchable. When supported by the thermoplastic mastic layer 10 it will resist scuffing and wear to a substantial degree making it serviceable as a wearing surface. It is also adapted to take a permanent embossed design so that it may be embossed to enhance its appearance to the same extent as a molded rubber mat or the like as shown in Figs. 3 and 4. In Figs. 1 and 2 lamination 12 is shown as plain or unembossed. When embossed it serves particularly well as a decorative floor covering for the trunk or other similar exposed compartment of an automobile.

Such lamination 12 is likewise moisture and asphalt resistant. The asphalt when fused spews, flows, or drains down through the wadding covered surface of the mastic. It will not spew through the lamination 12.

In Fig. 2 the sheet is shown as attached to metal sheet 18 by adhesion through the wadding covered surface as hereinabove described. In this figure of the drawing the laminated sheet is shown adhered to a metal surface having reinforcing ribs or the like. Such ribs here extend upwardly. They might be of any shape and project as desired. The metal sheet might be flat. Upon an irregularly contoured supporting surface the laminated sheet wilts into conforming or substantially conforming adhesive contact therewith as shown.

The thin filmy wadding layer 14 is completely saturated with asphalt in Fig. 2 and the asphalt has densified and concentrated upon the surface of the metal forming a secure bond between the mastic laminated layer and the metal sheet.

What I claim:

1. A laminated structure comprising, in combination, a supporting layer, a layer of asphaltic mastic and a lamination of cellulose material pervious to the flow of fused asphalt therethrough interposed between the supporting layer and the layer of asphaltic mastic, said layer of asphaltic mastic adhered to said supporting layer by asphalt spewed from the mastic layer through the interposed cellulose lamination.

2. A laminated structure comprising, in combination, a supporting layer, a superposed layer of asphaltic mastic, a lamination of thin non-tacky highly porous absorbent paper wadding readily pervious without rupture to the flow of fused asphalt therethrough interposed between the supporting layer and the layer of asphaltic mastic, said layer of asphaltic mastic adhered to said supporting layer by asphalt spewed from the mastic layer through the interposed cellulose lamination.

3. A laminated structure comprising, in combination, a layer of metal, a superposed layer of asphaltic mastic, a lamination of thin creped cellulose wadding highly pervious without rupture to the flow of fused asphalt therethrough interposed between the supporting layer and the layer of asphaltic mastic, said layer of asphaltic mastic adhered to said supporting layer by asphalt spewed from the mastic layer through the interposed cellulose lamination, said asphaltic mastic lamination provided on the surface opposite said metal lamination with an adhered lamination of non-tacky protective material resistant to the spewing of asphalt therethrough.

GEORGE R. CUNNINGTON.